(12) United States Patent
Bort et al.

(10) Patent No.: US 10,158,424 B2
(45) Date of Patent: *Dec. 18, 2018

(54) ESTABLISHING OPTICAL COMMUNICATION LINKS

(71) Applicant: International Business Machines Corporation, Armonk, NY (US)

(72) Inventors: Johannes Bort, Partenheim (DE); Emil O. Gemes, Mainz (DE); Frank Krick, Ockenheim (DE); Thorsten Muehge, Budenheim (DE); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/896,503

(22) Filed: Feb. 14, 2018

(65) Prior Publication Data
US 2018/0183519 A1    Jun. 28, 2018

Related U.S. Application Data

(63) Continuation of application No. 14/830,887, filed on Aug. 20, 2015, now Pat. No. 9,929,804.

(51) Int. Cl.
*H04B 10/00* (2013.01)
*H04B 10/11* (2013.01)
*H04B 10/114* (2013.01)

(52) U.S. Cl.
CPC ........... *H04B 10/11* (2013.01); *H04B 10/114* (2013.01)

(58) Field of Classification Search
CPC ..... H04B 10/11; H04B 10/112; H04B 10/114; H04B 10/116; H04B 10/1121; H04B 10/1143; H04B 10/1149; H04B 10/1125
(Continued)

(56) References Cited

U.S. PATENT DOCUMENTS

| | | | |
|---|---|---|---|
| 8,401,395 B2 * | 3/2013 | Xia | H04B 10/11 398/118 |
| 8,483,569 B2 | 7/2013 | Davidson et al. | |

(Continued)

OTHER PUBLICATIONS

Arnon et al. "Next-generation optical wireless communications for data centers", © 2015 Society of Photo-Optical Instrumentation Engineers (SPIE), Feb. 7, 2015, 3 pages, <http://proceedings.spiedigitallibrary.org/proceeding.axpx?articleid=2107481>.

(Continued)

*Primary Examiner* — Hanh Phan
(74) *Attorney, Agent, or Firm* — Daniel R. Simek (57) ABSTRACT

Aspects of the present invention disclose a method, computer program product, and system for establishing an optical communication link. The method includes one or more processors controlling an optical detection apparatus to scan an environment to detect at least one marker. The method further includes one or more processors detecting a first marker of the one or more markers, wherein the first marker includes information that indicates a location of a first optical access point. The method further includes one or more processors determining the location of the first optical access point based on an analysis of the first marker. The method further includes one or more processors controlling an optical communication apparatus to align with the determined location of the first optical access point. The method further includes one or more processors establishing an optical communication link between the optical communication apparatus and the first optical access point.

18 Claims, 5 Drawing Sheets

(58) Field of Classification Search
USPC ....... 398/118, 119, 127, 128, 130, 131, 129,
398/115, 172, 158, 159, 193, 194, 195,
398/183, 135, 136, 33, 25
See application file for complete search history.

(56) References Cited

U.S. PATENT DOCUMENTS

| | | |
|---|---|---|
| 2011/0243074 A1 | 10/2011 | Shin et al. |
| 2012/0155885 A1 | 6/2012 | Hannah et al. |
| 2013/0223846 A1 | 8/2013 | Joseph et al. |
| 2014/0161466 A1 | 6/2014 | Riza |
| 2014/0328597 A1 | 11/2014 | Bhide |
| 2016/0112124 A1* | 4/2016 | Juarez .................. H04B 10/112 398/118 |
| 2016/0072580 A1 | 10/2016 | Wabing |

OTHER PUBLICATIONS

Fenlon, Wesley, "How a Laser Can Transfer 26 Terabits of Data per Second", May 24, 2011, Tested, 4 pages, <http://www.tested.com/tech/2364-how-a-laser-can-transfer-26-terabits-of-data-per-second/>.

Hamedazimi, et al., "Patch Panels in the Sky: A Case for Free-Space Optics in Data Centers", Hotnets '13, Nov. 21-22, 2013, Copyright 2013 ACM, 7 pages, <http://conferences.sigcomm.org/hotnets/2013/papers/hotnets-final129.pdf>.

U.S. Appl. No. 14/830,887, filed Aug. 20, 2015.

Appendix P (List of IBM Patents or Patent Applications Treated as Related), 2 pages, filed herewith.

* cited by examiner

ESTABLISHING OPTICAL COMMUNICATION LINKS

BACKGROUND OF THE INVENTION

The present invention relates to a module for automatically establishing an optical communication link and more specifically the optical communication link being established between an optical communication apparatus and an optical access point.

In present day data centers, server units are connected to the data storage units via switches, the switches managing the data traffic. Usually servers, switches, and storage units are connected with each other by cables (e.g., via fiber or copper cables). The possible data transfer rates for cable-based communication between computing entities can be between 2 and 20 Gb/s.

Data centers usually house large numbers of racks that are populated with servers, storage systems, network components, and other equipment to operate the data center. To connect the components with each other, a variety of cabling models and architectures are deployed in data centers. Basically, there are two major use cases for cabling scenarios, which are the cabling across multiple racks, rooms, or even different data centers, and the cabling inside a single rack. A rack installation can contain several components, such as servers, storage systems, Ethernet switches, fiber channel switches, and others. Each server and storage component is connected with Ethernet cables to the internal Ethernet switches and with fiber channel cables to the internal storage area network (SAN) switches.

However, with an increasing number of individual racks that are connected using cable, the cabling scheme becomes increasingly complicated.

SUMMARY

Aspects of the present invention disclose a method, computer program product, and system for establishing an optical communication link. The method includes one or more processors controlling an optical detection apparatus to scan an environment to detect at least one marker. The method further includes one or more processors detecting a first marker of the one or more markers, wherein the first marker includes information that indicates a location of a first optical access point. The method further includes one or more processors determining the location of the first optical access point based on an analysis of the first marker. The method further includes one or more processors controlling an optical communication apparatus to align with the determined location of the first optical access point. The method further includes one or more processors establishing an optical communication link between the optical communication apparatus and the first optical access point.

DETAILED DESCRIPTION

An "optical communication link" as described herein may be a logical connection capable of transferring data between a sender and a receiver. The optical communication link may, for example, be based on laser radiation exchanged between an optical communication apparatus and an optical access point. For example, using Fast Fourier Transform (FFT) it is possible to encode data into laser radiation, thereby allowing for data transfer rates of up to 26 Tb/s.

An "optical communication apparatus" may be any apparatus adapted to receive information or data from a computer system and to transfer this data via an optical communication link. To this end, the optical communication apparatus may be adapted to produce radiation, e.g., a laser beam capable of carrying information. Information included in the laser radiation may then be read and interpreted (e.g., by an optical access point). Further, the optical communication apparatus may also be capable of receiving information via an optical communication link (e.g., by detecting a laser beam comprising information), the information being encoded into the laser beam (e.g., by applying an FFT). For example, the optical communication apparatus may comprise a laser diode, a photodiode, an interface for connecting the optical communication apparatus to a computer system. Further, the optical communication apparatus may comprise internal logic for processing data for transmitting the data via an optical communication link or for processing a received signal, thereby retrieving the data comprised in the signal.

An "optical access point" as understood herein may be an apparatus that is comparable to an optical communication apparatus, in that the optical access point may comprise means for sending and receiving data via an optical communication link (e.g., using laser beams). However, the optical access point is meant to communicate the received data to a local network, thereby providing the received data to other participants in a data center for further processing. Further, the optical access point may also be adapted to send data from the data center to a certain computer system having an optical communication apparatus installed thereon.

An "optical detection apparatus" may be a camera device that is adapted to scan the device's environment for markers, such as QR-codes or barcodes. To this end, the optical detection apparatus may comprise an optical sensor (e.g., a complementary metal-oxide semiconductor (CMOS) or charge-coupled device (CCD) chip), as well as corresponding optics for imaging the environment of the camera onto the optical sensor.

A "marker" may be any kind of graphical or physical object that can be detected using a camera. For identification of the marker, the camera may comprise internal logic capable of evaluating the contents of the part of the cameras environment, which is currently imaged onto the optical sensor due to the aperture of the imaging optics. If this evaluation results in finding that the part that is currently imaged onto the optical sensor comprises a marker, then the camera is assumed to be pointing towards the marker or be aligned with the marker. A marker may further comprises information encoded therein. In this case, the camera used for detecting the marker may further be operable to read the contents of the marker. For example, a marker may be a QR-code or a barcode.

The module, the optical communication apparatus, as well as the optical detection apparatus may be designed as an integral device that can be mounted onto a rack populated with server storage systems, network components, and other equipment in the rack being deployed in a data center. The integral device may further comprise electromechanical means for alignment of the device, such as a plurality of servo motors. The optical communication apparatus may then be operatively coupled to the equipment comprised in the rack to enable communication of the equipment with the data center via the optical communication link established between the optical communication apparatus and the optical access point.

Embodiments may have the advantage that the module, in combination with the optical communication apparatus and the optical detection apparatus, allows for a reduction of the configuration effort when deploying a rack comprising data equipment in a data center. On the one hand, the data communication across multiple racks or between a rack and a data center is established automatically without having to manually adjust the optical communication apparatus. While on the other hand, the transfer of data via the optical communication link reduces the number of cables in the data center and at the same time allows for increased data transfer rates. Using the described module in combination with an optical communication apparatus and an optical detection apparatus when setting up a rack in a data center, it would be sufficient to just plug in the power supply of the rack, such that the module can commence with automatically establishing the optical communication link for connecting the equipment comprised in the rack with the general communication network of the data center.

In some embodiments, analyzing the first marker comprises determining the spatial location of the first marker. The determination of the location of the first optical access point being performed by applying a predefined geometrical relation to the spatial location of the first marker. For example, the markers and the optical access points assigned to the markers can be arranged in a predefined geometrical relation. For example, the optical access points may be to the right of the assigned marker, and a predefined distance from the marker. Thus, upon detection of a marker the module only has to control the optical communication apparatus to realign, in accordance with the predefined geometrical relation, in order to establish the optical communication link with the corresponding optical access point. This may facilitate the establishing of the optical communication link as it is not necessary to further interpret the contents of the marker that has been detected by the optical detection apparatus.

In some embodiments, the analyzing of the first marker comprises reading a first location information encoded in the first marker. The determination of the location of the first optical access point being performed by using the read first location information.

In accordance with a further embodiment, the analyzing of the first marker further comprises determining the spatial location of the first marker, the read location information describing a geometrical relation to the spatial location of the first marker. For example, the geometrical relation read from the location information may inform the module that the optical access point assigned to the marker is located 2 degrees to the right and 4 degrees upwards seen from the position of the marker. The optical communication apparatus may then be realigned, according to the location information to establish an optical communication link, with the optical access point. This may have the advantage that the marker does not necessarily have to be located close to the optical access point. If, for example, a plurality of optical access points is located in a predefined area (e.g., on the ceiling of a room), then a plurality of markers may be distributed all around the walls of the room. The markers may then inform a module trying to establish an optical communication link to point its optical communication apparatus towards the predefined location on the ceiling of the room. This may, for example, allow providing a plurality of optical access points in an integral device thereby facilitating maintenance of the optical access points.

In some embodiments, the marker is further indicative of access data for establishing the optical communication link with the first optical access point. The analyzing of the first marker results in the determination of the access data of the first marker. The module is adapted to control the optical communication apparatus to use the determined access data for establishing the optical communication link. For example, the access data included in the marker may inform the module of a wavelength for communicating with the optical access point assigned to the first marker. Further, the access data may include keys for establishing an encrypted communication channel, or other data for establishing a communication link with the first optical access point. This may have the advantage that the module automatically can configure the optical communication apparatus appropriately for communication with the optical access point.

In some embodiments, the module is further connectable to a digital memory, the module being configured upon having established the optical communication link between the optical communication apparatus and the optical access point to control the optical detection apparatus to scan its environment for further markers. Further, the module is configured, upon detection of the location of the at least one further marker, to determine the location of the at least one further optical access point by analyzing the at least one further marker. In addition, the module is configured to store the determined location of the at least one further optical access point in the digital memory.

In additional embodiments, the module is further configured, upon interruption of the optical communication link, to determine the location of the at least one further optical access point from the digital memory and control the optical communication apparatus to establish an alternative optical communication link by aligning with the determined location of the at least one further optical access point.

Embodiments may have the advantage that by determining further optical access points and storing the location of the further optical access point in the digital memory, the time necessary to establish a new optical communication link, if an established optical communication link is interrupted, may be reduced. Scanning the environment of the optical detection apparatus for further markers may not be necessary in response to an interruption of an established optical communication link because the corresponding optical path is blocked. Instead, the module can use the location of further optical access points that have been determined before for establishing an alternative optical communication link; and thus, the outage times of the optical communication link can be reduced.

In some embodiments, the module is further configured to receive information indicative of a received signal quality resulting from the optical communication link at the first optical access point. Further, the module is configured to adjust the emission characteristics of the optical communication apparatus to increase the signal quality at the first optical access point.

For example, the optical access point may provide the power of the signal received at the optical access point to the module, whereupon the module controls the optical communication apparatus to change its emission characteristics. For example, the module may control the optical communication apparatus to realign the laser beam emitted by the optical communication apparatus to readjust the emitted wavelength or to refocus the laser beam. It may further be possible that the module also forwards information indicative of a received signal quality at the optical communication apparatus to the optical access point, such that the optical access point is operable to adjust its emission characteristics for an increased signal quality at the optical communication apparatus as well.

In some embodiments, the module is further connectable to a radio communication apparatus, and the module further being configured to control the radio communication apparatus to scan its environment for radio signals. The scanning results in the detection of at least one radio signal, and the at least one radio signal being indicative of the location, of at least one marker. In addition, the module is further configured to determine the location of the at least one marker by analyzing the at least one radio signal.

The controlling of the optical detection apparatus to scan an environment for markers comprises instructing the optical detection apparatus to scan an environment starting at a scanning direction being aligned relative to the determined location of the at least one marker. For example, the radio signal received at the radio communication apparatus may be the signal of a wireless local area network, and the signal can be indicative of a room in which the radio communication apparatus is currently located. If the radio communication apparatus and the module are both installed on the same rack, then the location of the radio communication apparatus corresponds to the location of the module. The module may then include a table, and the table includes a list of locations of markers provided in the room where the radio signal has been received. This may facilitate the scanning for markers, as the optical detection apparatus is provided with starting values that can lead to a faster detection of a marker.

In some embodiments, the radio communication apparatus is an RFID reader, and the at least one radio signal is an RFID signal. For example, the radio communication apparatus that is connected to the module may be located in a room, and the floor of the room includes a plurality of floor tiles, with each floor tile including an RFID tag. Upon reception of the RFID signal of such an RFID tag, the floor tile on which the module is currently located can be identified. As a result, the location of the module inside the room can be determined with an accuracy given by the size of the floor tiles. Further, the RFID tags may include information indicating a location at which to start scanning for markers (when located at the floor tile).

In some embodiments, the analyzing of the at least one radio signal comprises reading a second location information included in the at least one radio signal. The module is further being configured to determine the location of the optical detection apparatus utilizing the second location information. The determination of the location of the at least one marker can be performed by using the determined location of the optical detection apparatus. For example, the radio communication apparatus may receive three radio signals that are emitted from given points within a room. The module is then operable to triangulate the position of the radio communication apparatus using these three radio signals. If the module is installed in the same rack as the optical detection apparatus and the radio communication apparatus, then the position thus determined corresponds to the position of the optical detection apparatus. The module may then be operable to directly align the optical detection apparatus with the location of a marker (e.g., because the module comprises a corresponding table comprising entries giving the locations of markers for a given location of the module within the room). Thus, the scanning for markers can be facilitated.

In some embodiments, the determination of the location of the at least one marker comprises forwarding the determined location of the optical detection apparatus to a location service computer system. Further, in response to forwarding the determined location, the module is configured to receive a response from the location service's computer system, and the response is indicative of the location of the at least one marker.

For example, the module can determine its location by reading an RFID signal emitted by an RFID tag included in the floor tile of a server room. The module may then be operable to forward the determined location (e.g., via wireless local area network) to a computer system. The computer system includes a table with the location of markers for a given position in a server room. Upon receiving the information on the location of the module, the location service computer system may then forward a response to the module comprising the location of one or more markers for the given location of the module in the server room. This may as well facilitate the scanning for markers as the starting points for the scanning procedure are already known.

As previously described, another aspect of the invention relates to a system comprising an optical detection apparatus, at least one optical communication apparatus, and a module (described above). In accordance with an embodiment of the invention, the optical detection apparatus and the at least one optical communication apparatus are coaxially aligned, and the optical access points are located in the center of the markers. This may have the advantage that upon the detection of a marker, the optical communication apparatus is automatically aligned with the optical access point corresponding to the marker as both the optical detection apparatus and optical communication apparatus point towards the same direction. Thus, it is not necessary to realign the optical communication apparatus upon detection of a marker.

In some embodiments, the module is connected to a plurality of optical communication apparatuses. The module is configured to control at least a subset of the plurality of optical communication apparatuses to establish optical communication links, and each optical communication link employs a different optical access point. Embodiments may have the advantage that, by using a plurality of optical communication links, the system stability of the communication link between the optical communication apparatus and the optical access points is increased. Further, the data transfer rate may be increased as data may be communicated over a plurality of links.

Figure 1:
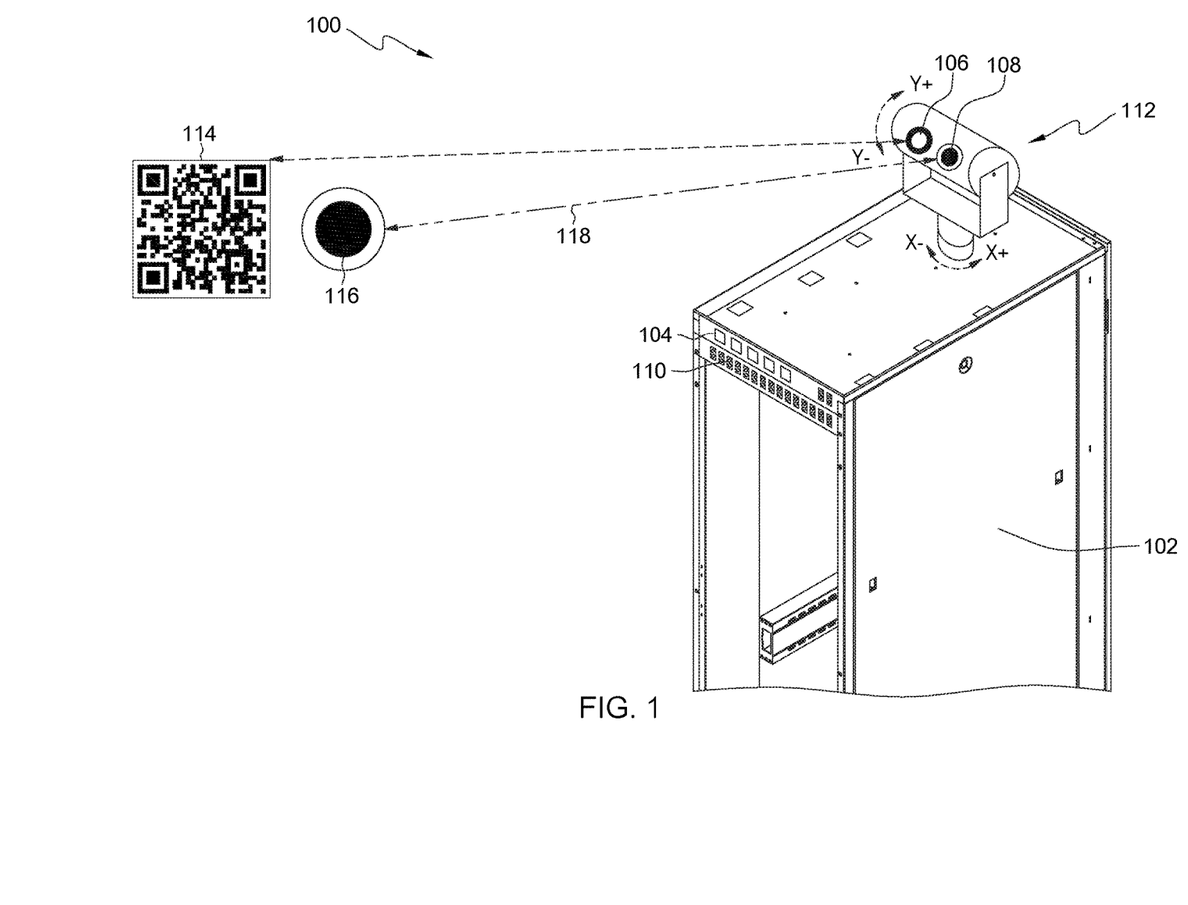
FIG. 1 depicts a rack with an optical communication apparatus, an optical detection apparatus, and a module, in accordance with an embodiment of the present invention.

FIG. 1 is an illustration of a system 100 comprising a rack 102, a module 104, an optical detection apparatus 106, and an optical communication apparatus 108. The rack 102 further comprises a network switch 110. The network switch 110 is connected to the module 104. As illustrated in FIG. 1, the optical detection apparatus 106 and the optical communication apparatus 108 are both included in an optical communication device 112. The optical communication device 112 is mounted on the top of the rack 102 and is connected to the module 104. The optical communication device 112 is mounted such that the optical communication device 112 can be rotated about an x-axis and can be tilted about a y-axis. As a result, the optical communication device can be directed towards any point around the rack 102.

The optical communication device 112 may further comprise two electric servo motors (not shown), which enable the automated adjustment of the optical detection apparatus 106 and the optical communication apparatus 108 included in the optical communication device 112 in the x-direction and y-direction. The rack 102 may be a server rack that is to be deployed in a data center. To this end, the rack 102 may include a plurality of servers, switches, storage units, and other IT equipment arranged in the rack 102 and interconnected with each other. The network communication cables of the components included in the rack 102 are routed and connected to the network switch 110. The network switch 110 is further connected to the module 104.

Upon deployment of the rack 102 (e.g., in a data center) and providing the rack 102 with electrical power (e.g., via a power supply), the module 104 may automatically start the method described herein for establishing an optical communication link with an optical access point provided in the data center. To this end, the module 104 may control the optical detection apparatus 106 to scan for markers 114, which can be provided on the walls and/or the ceiling of the room the rack 102 is deployed in. In the example depicted in FIG. 1, the marker 114 is given in the form of a QR code. Once the optical detection apparatus 106 successfully identifies the marker 114, the contents or the information provided with the QR code may be read. For example, the marker may include information on the location of an optical access point 116 and the corresponding information for establishing an optical communication link 118 with the optical access point 116. The information can include the type of optical access point, its transfer speed, wavelength, or other necessary information.

The location of the optical access point 116 may be given in the form of an offset to the edges of the detected QR code. The module 104 may then use that information to align the optical communication apparatus 108 with the optical access point 116. To increase the chances of establishing a communication channel between the optical access point 116 and the optical communication apparatus 108, the module 104 may control the optical communication apparatus 108 to emit a slightly divergent beam cone, such that the chance of illuminating the optical access point 116 is increased.

Once the optical access point 116 receives a first transmission from the optical communication apparatus 108, the optical access point 116 may communicate with the optical communication apparatus 108 in order to maximize the amplitude of the radiation received by the optical access point 116. For example, the optical access point 116 may communicate the received signal power to the optical detection apparatus 106 while the optical detection apparatus 106 slightly alters the direction of the emitted laser beam. Monitoring the signal thus received may allow for maximizing the received signal power at the optical communication device 112. Once the optical communication link 118 has been fully established, the components comprised in the rack 102 may communicate with the data center via the optical communication link 118 by forwarding information to the network switch 110, such that the information can be forwarded via the optical communication link 118.

In the situation depicted in FIG. 1, the optical access point 116 is located at the right edge of the marker 114. If all the optical access points provided in a room are located at the right edge of the corresponding marker 114, then including location information of the optical access point 116 in the marker 114 may not be necessary. It may be sufficient to store the information that optical access points are defined to be located at the right edge of a marker in the module 104. Upon detection of a marker 114, the module 104 will then automatically know a corresponding location of the optical access point 116 corresponding to the detected marker 114. However, it is also possible to alter the relative location of the marker 114 and the optical access point 116 as depicted in FIGS. 2A-C.

Figure 2A:
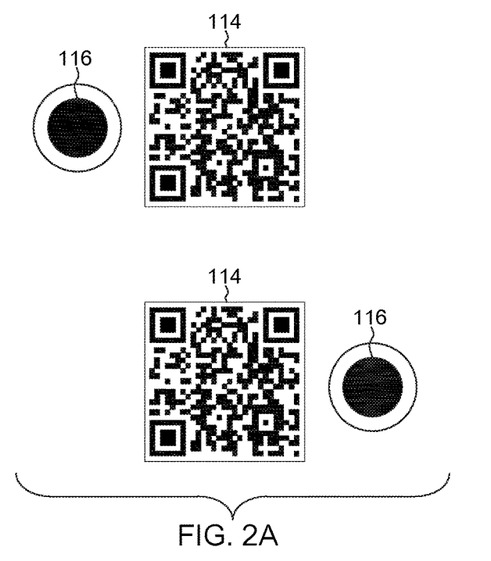
FIGS. 2A-C depict four examples of possible arrangements, markers, and optical access points, in accordance with an embodiment of the present invention.

In FIG. 2A two possibilities are given in which the optical access point 116 is located on the left or the right edge of the corresponding marker 114. The depicted different orientations may have the advantage that the location information included in the marker 114 can be kept very simple. For example, if the distance to the edges of the marker 114 is fixed, then the only information to be included in the marker 114 is the side of the marker 114 that the optical access point 116 is located.

Figure 2B:
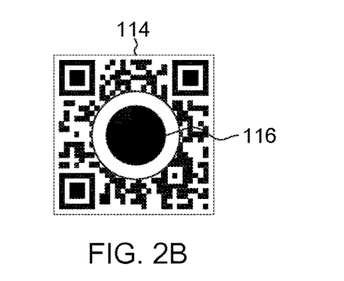

As depicted in FIG. 2B, it is also possible to locate the optical access point 116 in the center of the marker 114, which may be advantageous if the optical detection apparatus 106 and the optical communication apparatus 108 are coaxially aligned. In this case, the optical communication apparatus 108 can automatically be aligned with the optical access point 116 as soon as the optical detection apparatus 106 detects the marker 114. Thus, including information on the location of the optical access point 116 in the marker 114 can become unnecessary.

Figure 2C:
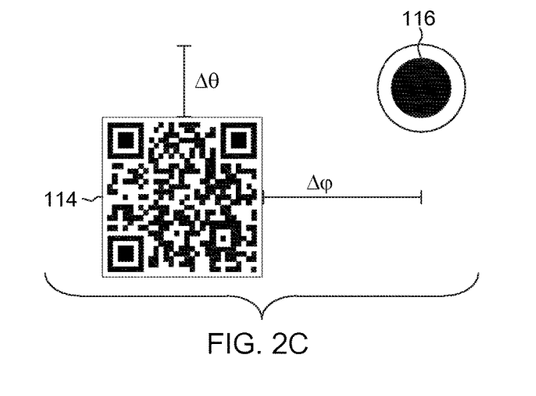

In yet another embodiment shown in FIG. 2C, the optical access point 116 may be at any location relative to the marker 114. In this case, the marker 114 can include information on a tilting angle utilized to get from the marker 114 to the optical access point 116. To this end, the marker 114 may include offsets for both the polar angle $\Delta\varphi$ and the azimuth angle $\Delta\theta$ starting from the location of the marker 114. Further, one instance of marker 114 can potentially include information on a plurality of optical access points 116. For example, the marker 114 may include a list of combinations of offsets for the polar angle $\Delta\varphi$ and azimuth angle $\Delta\theta$, such that the module 104 may decide which optical access point 116 to utilize. Advantages can exist in instances where the different optical access points 116 all operate on different wavelengths, such that the module 104 may determine which optical access point 116 is suitable for communication with the optical communication apparatus 108, which may only be operable to emit laser radiation of a predefined wavelength.

Figure 3:
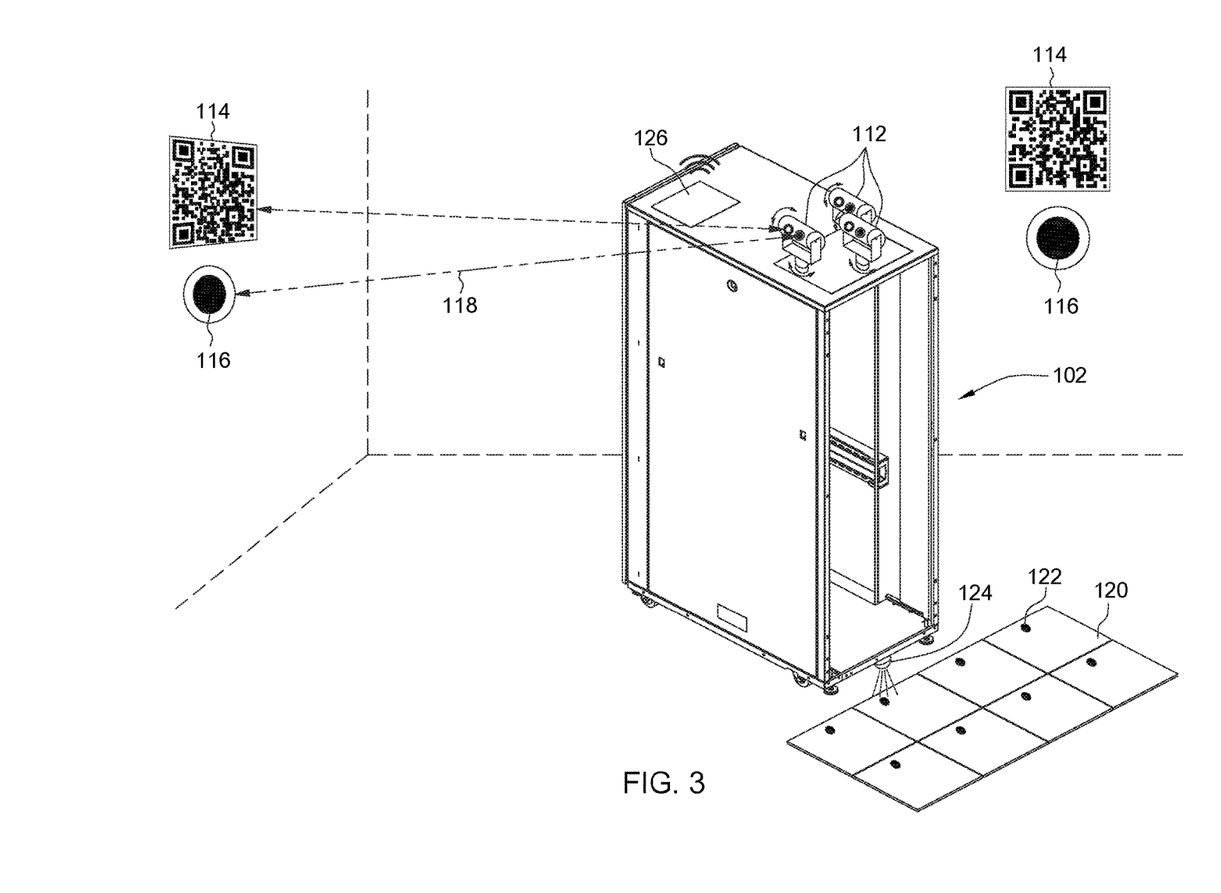
FIG. 3 depicts a rack with a plurality of optical communication apparatus and optical detection apparatus located in a server room, in accordance with an embodiment of the present invention.

FIG. 3 is a schematic of a rack 102, which is located in a server room. The server room floor includes a plurality of floor tiles 120, and the floor tiles 120 can include RFID tags 122. The depicted instance of rack 102 has three optical communication devices 112 mounted on top of the rack 102. The rack 102 further includes a network switch 110, as well as a module 104 (not shown in FIG. 3). The rack 102 further includes an RFID reader 124 located at the bottom side of the rack 102. Further, the rack 102 may include a transceiver 126 that may be operable to communicate via a wireless local area network. The room that the rack 102 is located in has two instances of markers 114 with corresponding optical access points 116 provided on the walls of the room.

Upon deployment of the rack 102 in a room and connecting the rack 102 to an external power supply, the RFID reader 124 may scan the environment for RFID tags. Scanning can result in the detection of an instance of RFID tag 122 that is closest to the RFID reader 124. The RFID tags 122 may include information on the location of the corresponding instances of floor tiles 120 in the room. From the retrieved location information, the module 104 may determine a starting direction in which to search for markers 114. To this end, the module 104 may control the transceiver 126 to send a query to a location service computer system, the query comprising the location of the rack 102 in the corresponding room. The query may further demand the provision with starting directions for searching for markers 114 from the given location. The location service computer system can (not shown in FIG. 3) then respond by providing corresponding directions that the instances of optical detection apparatus 106 of the optical communication devices 112 can use when scanning for markers 114. Providing directions can shorten the scanning procedure as the starting direction already will be close to a marker 114. In addition, the RFID tags 122 can be designed such that the tags already include information on the direction in which to search for markers 114. In this case, the querying of a location service computer system may not be necessary.

As described above, the rack 102 depicted in FIG. 3 has three optical communication devices 112 mounted on top. As is further illustrated in FIG. 3, one of the optical communication devices 112 may establish an optical communication link 118 with an optical access point 116. The module 104 may now be designed to search for further markers 114 using the remaining instances of optical communication device 112 that are not yet part of an optical communication link 118. As a result, the remaining instances of optical communication device 112 may scan the room for further markers, thereby finding a marker located to the right of the rack 102. One of the optical communication devices 112 may then establish an optical communication link 118 with the corresponding optical access point 116, thereby increasing the stability of the communication link between the rack 102 and the data center location of the rack 102.

Even in case that rack 102 only has one instance of optical communication device 112 installed, the module 104 may cause the optical detection apparatus 106 to search for further markers 114 once an optical communication link 118 has been established. Upon detection of a further markers 114, the module 104 may then store the location of the further markers 114 or even of the further optical access point 116 in a local memory. In case the established optical communication link 118 is interrupted (e.g., because of a failure of the corresponding optical access point or because of a blocking of the optical path between the optical access point 116 and the rack 102), the module 104 may then control the optical communication device 112 to establish another optical communication link 118 using the location of the further optical access point 116 that has been determined before. As a result, the outage time upon interruption of an optical communication link 118 can be reduced.

Figure 4:
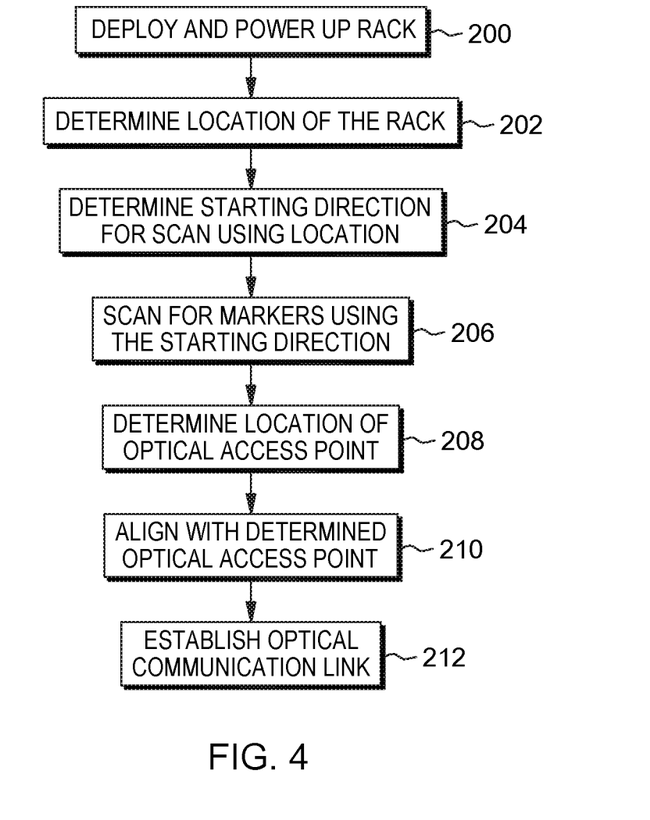
FIG. 4 depicts a flowchart of a method for automatically establishing an optical communication link, in accordance with an embodiment of the present invention.

FIG. 4 is a flowchart of a method for automatically establishing an optical communication link between an optical communication apparatus 108 and an optical access point 116. As described, for example, with reference to FIG. 1 or 3, the optical communication apparatus 108 may be arranged on top of a rack 102. In process 200, the rack 102 is deployed in a room data center and connected to an external power supply. Upon powering up the rack 102, process 202 determines the location of the rack 102 (e.g., utilizing an RFID reader 124 reading RFID tags 122 included in the floor tiles 120 of the room that houses the rack 102).

Having determined the location of the rack 102, process 204 determines a starting point for searching for markers 114 (e.g., by querying a corresponding location service computer system for a starting direction using the determined location). Using the determined starting direction, in process 206 the module 104 may then control the optical detection apparatus 106 to scan for markers 114. The scan can result in the detection of a first instance of marker 114.

Upon detection of a marker 114, in process 208 the optical detection apparatus 106 may then read the marker 114, thereby determining location information for an optical access point 116 that is assigned to the detected marker 114. Using the determined location of an optical access point 116 assigned to the detected marker 114, in process 210 the module 104 may then control the optical communication apparatus 108 to align with the determined optical access point 116. Further, process 212 establishes an optical communication link 118 between the optical communication apparatus 108 and the determined optical access point 116.

Figure 5:
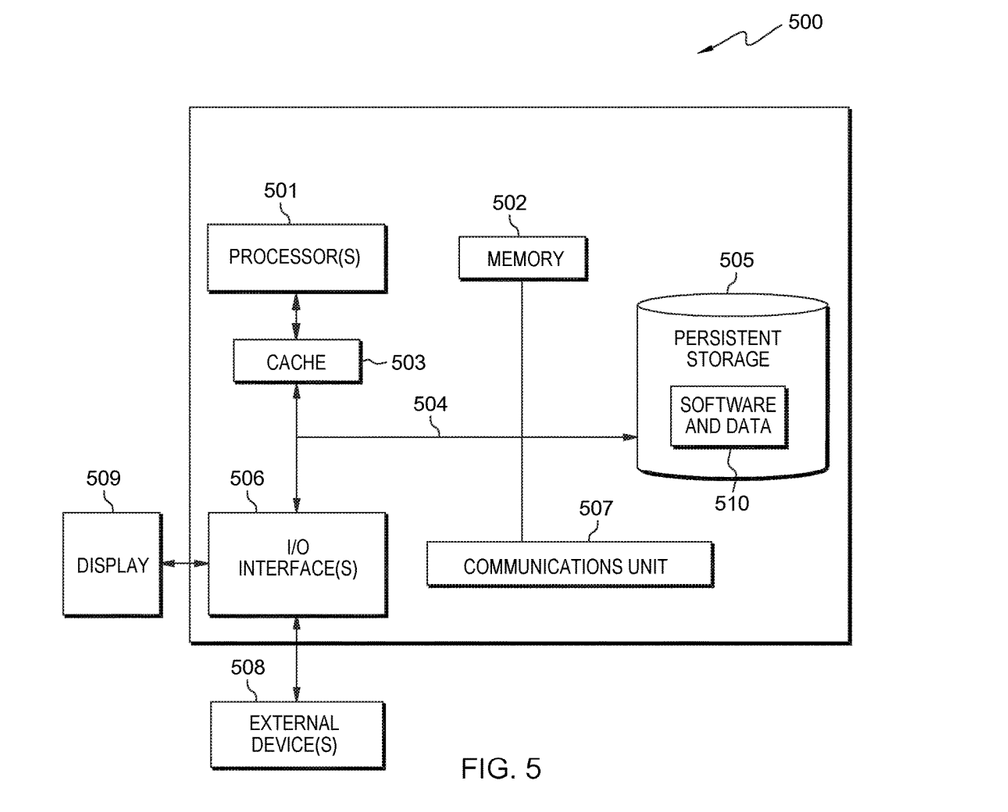
FIG. 5 depicts a block diagram of components of a computing system, in accordance with an embodiment of the present invention.

FIG. 5 depicts computer system 500, which is representative of various computing systems utilized to perform the method described in FIG. 4, such as a module 104, an optical detection apparatus 106, and an optical communication apparatus 108, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made. Computer system 500 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data (e.g., software and data 510) used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 510 can be stored in persistent storage 505 for access and/or execution by one or more of the respective processor(s) 501 via cache 503. In various embodiments, software and data 510 includes one or more processes capable of performing the method described in FIG. 4, in accordance with embodiments of the present invention.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data (e.g., software and data 510) used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Program instructions and data (e.g., software and data 510) used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for establishing an optical communication link, the method comprising:
   controlling, by one or more processors, an optical detection apparatus to scan an environment to detect at least one marker;
   detecting, by one or more processors, a first marker of the at least one marker, wherein the first marker includes information that indicates a location of a first optical access point;
   determining, by one or more processors, the location of the first optical access point based on an analysis of the first marker;
   controlling, by one or more processors, an optical communication apparatus to align with the determined location of the first optical access point;
   establishing, by one or more processors, an optical communication link between the optical communication apparatus and the first optical access point;
   identifying, by one or more processors, a signal strength of corresponding to the optical communication link; and
   adjusting, by one or more processors, emission characteristics of the optical communication apparatus to increase signal quality at the first optical access point.

2. The method of claim 1, wherein determining the location of the first optical access point based on an analysis of the first marker, further comprises:
   determining, by one or more processors, a spatial location of the first marker; and
   applying, by one or more processors, a predefined geometric relation to the determined spatial location of the first marker to determine the location of the first optical access point.

3. The method of claim 1, wherein determining the location of the first optical access point based on an analysis of the first marker, further comprises:
   determining, by one or more processors, a spatial location of the first marker;
   reading, by one or more processors, a first set of location information that is encoded in the first marker, wherein the read first set of location information describes a geometric relation to the spatial location of the first marker; and
   determining, by one or more processors, the location of the first optical access marker utilizing the read first set of location information.

4. The method of claim 1, further comprising:
   analyzing, by one or more processors, the first marker to identify access information that is included in the first marker; and
   wherein the access information is utilized to establish the optical communication link.

5. The method of claim 1, further comprising:
   in response to establishing the optical communication link between the optical communication apparatus and the first optical access point, controlling, by one or more processors, the optical detection apparatus to scan the environment to detect additional markers;
   detecting, by one or more processors, a second marker of the additional markers wherein the second marker includes information that indicates a location of a second optical access point;
   determining, by one or more processors, the location of the second optical access point based on an analysis of the second marker;
   storing, by one or more processors, the determined location of the second optical access point in digital memory;
   in response to an interruption to the established optical communication link, identifying, by one or more processors, the location of the second optical access point stored in the digital memory; and
   controlling, by one or more processors, the optical communication apparatus to establish an alternative optical communication path by aligning with the identified location of the second optical access point.

6. The method of claim 1, further comprising:
   controlling, by one or more processors, a radio communication apparatus to scan the environment to detect at least one radio signal;

detecting, by one or more processors, a first radio signal of the at least one radio signal, wherein the first radio signal includes information that indicates a location of a first marker;

determining, by one or more processors, the location of the first marker based on an analysis of the first radio signal; and instructing, by one or more processors, the optical detection apparatus to scan the environment for markers starting at a scanning direction that is aligned relative to the determined location of the first marker.

7. The method of claim 6, wherein the radio communication apparatus is an Radio-frequency identification (RFID) reader, and the at least one radio signal is an RFID signal.

8. A computer system for establishing an optical communication link, the computer system comprising:
one or more computer processors;
one or more computer readable storage media; and
program instructions stored on the computer readable storage media for execution by at least one of the one or more processors, causing the processors to perform actions comprising:
controlling an optical detection apparatus to scan an environment to detect at least one marker;
detecting a first marker of the at least one marker, wherein the first marker includes information that indicates a location of a first optical access point;
determining the location of the first optical access point based on an analysis of the first marker;
controlling an optical communication apparatus to align with the determined location of the first optical access point;
establishing an optical communication link between the optical communication apparatus and the first optical access point;
identifying a signal strength of corresponding to the optical communication link; and
adjusting emission characteristics of the optical communication apparatus to increase signal quality at the first optical access point.

9. The computer system of claim 8, wherein determining the location of the first optical access point based on an analysis of the first marker, further comprises:
determining a spatial location of the first marker; and
applying a predefined geometric relation to the determined spatial location of the first marker to determine the location of the first optical access point.

10. The computer system of claim 8, wherein determining the location of the first optical access point based on an analysis of the first marker, further comprises:
determining a spatial location of the first marker;
reading a first set of location information that is encoded in the first marker, wherein the read first set of location information describes a geometric relation to the spatial location of the first marker; and
determining the location of the first optical access marker utilizing the read first set of location information.

11. The computer system of claim 8, further comprising program instructions, causing the processors to perform the actions comprising:
analyzing the first marker to identify access information that is included in the first marker; and
wherein the access information is utilized to establish the optical communication link.

12. The computer system of claim 8, further comprising program instructions, causing the processors to perform the actions comprising:
in response to establishing the optical communication link between the optical communication apparatus and the first optical access point, controlling the optical detection apparatus to scan the environment to detect additional markers;
detecting a second marker of the additional markers wherein the second marker includes information that indicates a location of a second optical access point;
determining the location of the second optical access point based on an analysis of the second marker;
storing the determined location of the second optical access point in digital memory;
in response to an interruption to the established optical communication link, identifying the location of the second optical access point stored in the digital memory; and
controlling the optical communication apparatus to establish an alternative optical communication path by aligning with the identified location of the second optical access point.

13. The computer system of claim 8, further comprising program instructions, causing the processors to perform the actions comprising:
controlling a radio communication apparatus to scan the environment to detect at least one radio signal;
detecting a first radio signal of the at least one radio signal, wherein the first radio signal includes information that indicates a location of a first marker;
determining the location of the first marker based on an analysis of the first radio signal; and
instructing the optical detection apparatus to scan the environment for markers starting at a scanning direction that is aligned relative to the determined location of the first marker.

14. The computer system of claim 13, wherein the radio communication apparatus is an Radio-frequency identification (RFID) reader, and the at least one radio signal is an RFID signal.

15. A computer program product for establishing an optical communication link, the computer program product comprising:
one or more computer readable storage media and program instructions stored on the one or more computer readable storage media, the program instructions when executed by one or more processors causing the one or more processors to perform operations comprising:
controlling an optical detection apparatus to scan an environment to detect at least one marker;
detecting a first marker of the at least one markers, wherein the first marker includes information that indicates a location of a first optical access point;
determining the location of the first optical access point based on an analysis of the first marker;
controlling an optical communication apparatus to align with the determined location of the first optical access point;
establishing an optical communication link between the optical communication apparatus and the first optical access point;
identifying a signal strength of corresponding to the optical communication link; and
adjusting emission characteristics of the optical communication apparatus to increase signal quality at the first optical access point.

16. The computer program product of claim 15, wherein determining the location of the first optical access point based on an analysis of the first marker, further comprises:
   determining a spatial location of the first marker; and
   applying a predefined geometric relation to the determined spatial location of the first marker to determine the location of the first optical access point.

17. The computer program product of claim 15, wherein determining the location of the first optical access point based on an analysis of the first marker, further comprises:
   determining a spatial location of the first marker;
   reading a first set of location information that is encoded in the first marker, wherein the read first set of location information describes a geometric relation to the spatial location of the first marker; and
   determining the location of the first optical access marker utilizing the read first set of location information.

18. The computer program product of claim 15, further comprising program instructions, causing the processors to perform the actions comprising:
   analyzing the first marker to identify access information that is included in the first marker; and
   wherein the access information is utilized to establish the optical communication link.

* * * * *